United States Patent [19]

Hockemeyer et al.

[11] 4,208,504
[45] Jun. 17, 1980

[54] ADHESIVE REPELLENT COATINGS AND SUBSTRATES COATED THEREWITH

[75] Inventors: Friedrich Hockemeyer, Bergham; Wolfgang Hechtl, Burghausen; Heinrich Marwitz, Burghausen; Paul Hittmair, Burghausen, all of Fed. Rep. of Germany

[73] Assignee: Wacker-Chemie GmbH, Munich, Fed. Rep. of Germany

[21] Appl. No.: 950,893

[22] Filed: Oct. 12, 1978

Related U.S. Application Data

[60] Division of Ser. No. 872,692, Jan. 26, 1978, Pat. No. 4,154,714, which is a continuation of Ser. No. 663,896, Mar. 4, 1976, abandoned.

[51] Int. Cl.$^2$ ............................................. C08G 77/06
[52] U.S. Cl. ................................ 528/15; 260/31.2 R; 260/32.8 SB; 260/33.2 SB; 260/33.8 SB; 260/33.6 SB; 427/387; 428/447; 525/478; 528/31; 528/32; 528/33; 528/43
[58] Field of Search ........................ 427/387; 428/447; 528/15, 31, 32, 33, 43; 260/31.2 R, 32.8 SB, 33.2 SB, 33.8 SB, 33.6 SB, 825

[56] References Cited

U.S. PATENT DOCUMENTS

| | | | |
|---|---|---|---|
| 3,814,731 | 6/1974 | Nitzsche et al. | 528/32 |
| 3,936,582 | 2/1976 | Keiser | 428/447 |
| 4,051,454 | 9/1977 | Leiser et al. | 428/447 |

*Primary Examiner*—Melvyn I. Marquis

[57] ABSTRACT

Coating compositions which impart adhesive repellent or non-adherent properties to substrates coated therewith comprising (1) vinyl endblocked diorganopolysiloxanes having an average viscosity in excess of $10^6$ cP at 25° C. in which from 3 to 30 mole percent of the nonterminal siloxane units are diphenylsiloxane units and at least 50 mole percent of the remaining organic radicals on the siloxane units are methyl radicals, (2) organopolysiloxanes having at least 3 Si-bonded hydrogen atoms per molecule, (3) catalysts which promote the addition of Si-bonded hydrogen atoms to the vinyl groups and (4) an inert organic solvent. These coating compositions may be applied to cellulosic materials and other substrates to impart varying degrees of adhesive repellency thereto.

6 Claims, No Drawings

ADHESIVE REPELLENT COATINGS AND SUBSTRATES COATED THEREWITH

This is a division of application Ser. No. 872,692, filed Jan. 26, 1978 and now U.S. Pat. No. 4,154,714, which is a continuation of Ser. No. 663,896 filed Mar. 4, 1976 which is abandoned.

This invention relates to coating compositions which will impart varying degrees of adhesive repellency to substrates, such as cellulosic substrates, and to a process for preparing the same. More particularly, the invention is concerned with a process for rendering cellulosic or other substrates substantially non-adherent to normally adherent materials such as, for example, asphalts, bitumen, tars, waxes, paraffin solids, foodstuffs, pastes, adhesives and other high molecular weight polymers which may come in contact with the substrates.

It is well known that cellulosic materials and other substrates may be treated with silicones and a host of other materials containing a variety of siloxane polymers, particularly siloxane fluids and resins to render these substrates adhesive repellent, i.e., non-adhesive or easily released from adhesive or sticky material. (see for example, W. Noll, "Chemie und Technologie der Silicone"). However, the repellency of various types of substrates such as smooth or coarse paper will vary with the adhesive, therefore it is necessary to compensate for the varying degrees of repellency of the coated substrates in order to achieve the desired degree of repellency. Moreover, since these adhesive repellent coatings are used in various applications, it is essential that the coatings have varying degrees of so-called "separating force level". For example, the packaging of sticky foods such as meat generally requires a high level of repellency, i.e., a low separating force level, while self-adhesive labels or carriers intended to transfer adhesive coatings by means of a so-called "transfer process" require a lesser degree of repellency in order to prevent, for example, the self-adhesive labels from detaching from the base to which they have been affixed prior to use.

Adhesive repellent coatings containing (1) diorganopolysiloxanes having Si-bonded vinyl groups in the terminal units in which from 3 to 30 mole percent of the nonterminal siloxane units are diphenylsiloxane units and at least 50 mole percent of the organic radicals of the remaining siloxane units are methyl radicals, (2) organopolysiloxanes which contain at least 3 Si-bonded hydrogen atoms per molecule and (3) catalysts which promote the addition of Si-bonded hydrogen to the vinyl groups and subsequent crosslinking of the organopolysiloxanes (1) are known in the art. (See U.S. Pat. No. 3,814,731, to Nitzsche et al). This patent discloses that adhesive repellency decreases as the percentage of diphenylsiloxane units increases. In other words, various concentrations of diphenylsiloxane units in the diorganopolysiloxanes (1) result in various levels of adhesive repellency. However the compositions of this invention which contain diorganopolysiloxanes having terminal Si-bonded vinyl groups, organopolysiloxanes having at least 3 Si-bonded hydrogen atoms per molecule and catalysts which promote the addition of Si-bonded hydrogen to vinyl groups, generally require a greater proportion of diorganopolysiloxanes having terminal Si-bonded vinyl groups than organopolysiloxanes which have at least 3 Si-bonded hydrogen atoms per molecule. Therefore in order to obtain various levels of adhesive repellency by means of varying the concentration of diphenylsiloxane units in the diorganopolysiloxanes having terminal Si-bonded vinyl groups, it is necessary to produce and store large quantities of various, relatively high viscous diorganopolysiloxanes. However the present invention only requires the preparation and storage of relatively small quantities of various organopolysiloxanes having a relatively low viscosity and containing at least 3 Si-bonded hydrogen atoms per molecule in order to achieve various levels of adhesive repellency. Moreover, it is possible to achieve a lower level of adhesive repellency with small amounts of relatively difficult to obtain organopolysiloxanes containing diphenylsiloxane units.

In addition, even after 24 hours after application, the compositions of this invention yield coatings which show the same or practically the same level of adhesive repellency as coatings made from freshly prepared mixtures. Also, the compositions of this invention have a very long "pot-life"; however, even with a long "pot-life", they rapidly crosslink at temperatures generally used in most applications. Moreover, continuously operating coating equipment can be used without any precautions to prevent migration of the coatings, i.e., undesirable movement of flow of the adhesive repellent coatings. Furthermore, the adhesive repellent properties of the coatings of this invention remain unaltered or practically unaltered over a period of several months.

It is therefore an object of this invention to provide coating compositions which will impart release properties to substrates coated therewith. Another object of this invention is to provide coating compositions which will impart non-adherent properties to substrates coated therewith when contacted with adhesive materials. Another object of this invention is to provide compositions having a longer "pot-life". Still another object of this invention is to provide compositions which cure rapidly when applied to substrates. A further object of this invention is to provide coatings which have varying degrees of repellency when contacted with adhesive materials. A still further object of this invention is to provide a process for preparing adhesive repellent coatings.

The foregoing objects and others which will become apparent from the following description are accomplished in accordance with this invention, generally speaking, by providing adhesive repellent coating compositions comprising a solution of (1) diorganopolysiloxanes having terminal Si-bonded vinyl groups in which from 3 to 30 mole percent of the nonterminal units are diphenylsiloxane units and at least 50 mole percent of the organic radicals on the remaining siloxane units are methyl radicals, (2) organopolysiloxanes which have at least 3 Si-bonded hydrogen atoms per molecule, (3) catalysts which promote the addition of Si-bonded hydrogen to vinyl groups and (4) an inert organic solvent. The diorganopolysiloxanes (1) which have terminal Si-bonded vinyl groups are further characterized in that they have an mkp (meter kilo pond) factor of from 300 to 800 as determined in a Brabender Plastograph at 25° C. and at 60 revolutions per minute. These coating compositions are applied to substrates and then heated to a temperature of at least 80° C. to remove the solvent and promote crosslinking of the organopolysiloxanes.

The diorganopolysiloxanes (1) having terminal Si-bonded vinyl groups in which 3 to 30 mole percent of the nonterminal siloxane units are diphenylsiloxane units and at least 50 mole percent of the organic radicals of the remaining siloxane units are methyl radicals, may be represented by the general formula:

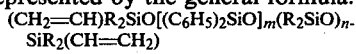
$(CH_2=CH)R_2SiO[(C_6H_5)_2SiO]_m(R_2SiO)_n\text{-}SiR_2(CH=CH_2)$ wherein R which may be the same or different represents monovalent hydrocarbon radicals and substituted monovalent hydrocarbon radicals, with the provision that at least 50 mole percent of the R radicals are methyl radicals, m and n each represent numbers whose sum results in the diorganopolysiloxanes (1) having an mkp value of from 300 to 800 as determined by a Brabender Plastograph at 25° C. and at 60 revolutions per minute and furthermore m is from 3 to 30 mole percent of the sum of m+n.

The organopolysiloxane formula illustrated above may contain within or along the siloxane chain units other than the diorganosiloxane units shown above, i.e., units corresponding to the formulae $(C_6H_5)_2SiO$ and $R_2SiO$. Examples of other siloxane units which are present generally only as impurities, are those corresponding to the formulae $RSiO_{3/2}$, $R_3SiO_{\frac{1}{2}}$ and $SiO_{4/2}$, where R is the same as above. These other siloxane units are preferably present in an amount of less than 10 mole percent and more preferably not more than about 1 mole percent.

Examples or organic radicals other than the methyl radicals, phenyl radicals and terminal vinyl radicals which may be present in the diorganopolysiloxanes (1) are saturated hydrocarbon radicals such as alkyl radicals having up to 18 carbon atoms, e.g., ethyl, n-propyl, isopropyl and radicals up to and including octadecyl radicals; cycloaliphatic hydrocarbon radicals, such as the cyclohexyl radical, aryl radicals such as the phenyl radical; alkaryl radicals such as the tolyl radical and aralkyl radicals such as the benzyl radical. An example of a substituted hydrocarbon radical is the 3,3,3-trifluoropropyl radical. Other hydrocarbon radicals represented by R are vinyl radicals or other alkenyl radicals, such as the allyl or decenyl radicals. In order to obtain flexible coatings, it is preferred that the nonterminal hydrocarbon radicals in the diorganopolysiloxanes (1) be saturated hydrocarbon radicals, i.e., free of aliphatic unsaturation such as vinyl radicals.

It is preferred that from 5 to 20 mole percent of the siloxane units which are nonterminal units be diphenylsiloxane units. Moreover, it is preferred that at least 70 mole percent of the nonterminal siloxane units be dimethylsiloxane units. The hydrocarbon radicals which are present in the other siloxane units can be the same or different, regardless of whether they are linked to the same or different silicon atoms.

If all the organic radicals in the diorganopolysiloxanes (1) are methyl radicals except the terminal vinyl groups, then varying the concentration of Si-bonded hydrogen in the organopolysiloxanes (2) does not produce any distinguishable variation in the level of adhesive repellency with respect to identical adhesive substances.

As a matter of fact, the degree of adhesive repellency of the coatings prepared pursuant to this invention increases when the proportion of phenyl groups and especially the content of diphenylsiloxane units in the diorganopolysiloxanes (1) increases.

The diorganopolysiloxanes (1) may contain identical copolymers or mixtures of various copolymers which have the same degree of polymerization, or mixtures of identical or different copolymers which have different degrees of polymerization. The diorganopolysiloxanes (1) can be copolymers having a random distribution of the various units or block-copolymers.

If the diorganopolysiloxanes (1) do not have a Brabender Plastograph value of from 300 to 800 mkp at 25° C. and at 60 revolutions per minute, which corresponds to a viscosity far in excess of $10^6$ cP at 25° C., then it is impossible to achieve any variation in the degree of adhesive repellency with respect to surfaces coated with identical adhesives as a result of the variation in the concentration of Si-bonded hydrogen in the organopolysiloxanes (2). A Brabender Plastograph is for example illustrated in the text by K. Frank, "Prüfungsbuch füur Kautschuk und Kunststoffe," (Stuttgart 1955), page 25.

The preparation of diorganopolysiloxanes (1) having terminal Si-bonded vinyl groups in which 3 to 30 mole percent of the nonterminal siloxane units are diphenylsiloxane units and at least 50 mole percent of the organic radicals in the remaining siloxane units are methyl radicals and which have an mkp factor of from 300 to 800 as determined in a Brabender Plastograph at 25° C. and at 60 revolutions per minute, is generally known. These diorganopolysiloxanes can be prepared for example by the hydrolysis of a mixture of from 3 to 30 mole percent of diphenyldichlorosilane and 97 to 70 mole percent of dimethyldichlorosilane and very small amount of vinylmethyldichlorosilane, in the presence of an aqueous alkali hydroxide solution containing from 3 to 20 mole percent by weight of alkali hydroxide based on the total weight of water and alkali hydroxide and the condensation and equilibration of the hydrolysate is conducted in the presence of phosphoronitrile chlorides.

The organopolysiloxanes (2) which have at least 3 Si-bonded hydrogen atoms per molecule are the same organopolysiloxanes which have been used heretofore in the preparation of adhesive repellent coatings containing vinyl terminated diorganopolysiloxanes, organopolysiloxanes having at least 3 Si-bonded hydrogen atoms per molecule and catalysts which promote the addition of Si-bonded hydrogen to vinyl groups.

Organopolysiloxanes (2) which have at least 3 Si-bonded hydrogen atoms per molecule and the valences of the silicon atoms which are not saturated with hydrogen atoms or siloxane oxygen atoms, are preferably saturated with lower alkyl radicals such as methyl or ethyl radicals or aryl radicals, such as the phenyl radical. These organopolysiloxanes (2) may be represented by the following general formula:

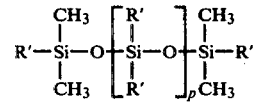

wherein R' represents hydrogen or a lower alkyl radical such as methyl, ethyl, or an aryl radical such as a phenyl radical; however, only one hydrogen atom may be bonded to any one silicon atom and the amount of Si-bonded hydrogen atoms in the organopolysiloxanes corresponding to the above formula ranges from 0.10 to 1.66 mole percent by weight, and p is a number of from 20 to 500 and more preferably a number of from 20 to 100. Because of their availability, methyl radicals are preferred as the hydrocarbon radicals which are linked to silicon atoms which contain Si-bonded hydrogen atoms.

Examples of diorganopolysiloxanes (2) which correspond to the above formula are copolymers consisting of dimethylhydrogensiloxane, methylhydrogensiloxane, dimethylsiloxane and trimethylsiloxane units; copolymers of methylhydrogensiloxane and trimethylsiloxane units; copolymers of methylhydrogensiloxane, dimethylsiloxane and trimethylsiloxane units; copolymers of methylhydrogensiloxane, diphenylsiloxane and trimethylsiloxane units; copolymers of methylhydrogensiloxane, dimethylhydrogensiloxane and diphenylsiloxane units; copolymers of methylhydrogensiloxane, phenylmethylsiloxane, trimethylsiloxane and/or dimethylhydrogensiloxane units and copolymers of methylhydrogensiloxane, dimethylsiloxane, diphenylsiloxane and trimethylsiloxane and/or dimethylhydrogensiloxane units.

The higher the proportion of Si-bonded hydrogen groups in the organopolysiloxanes (2), the lower the level of adhesive repellency.

It is preferred that the mole ratio of the siloxane units having one Si-bonded hydrocarbon radical in relation to the siloxane units having two Si-bonded hydrocarbon radicals in the organopolysiloxanes (2) may range from 10:0 to 1:10. It is preferred that the organopolysiloxanes (2) have a viscosity of 30 to 80 cP at 25° C.

Organopolysiloxanes (2) including those of the preferred type, are generally known. Such organopolysiloxanes (2) can for example be prepared by the co-hydrolysis of dimethyldichlorosilane, methyldichlorosilane, dimethylchlorosilane and/or trimethylchlorosilane. However it is preferable that the organopolysiloxanes employed in accordance with this invention be prepared by equilibrating trimethylsiloxy or dimethylhydrogensiloxy terminated methylhydrogensiloxanes, with dimethylsiloxanes and/or diphenylsiloxanes and/or phenylmethylsiloxanes which are endblocked with trimethylsiloxy groups, in the presence of an acid equilibration catalyst.

The organopolysiloxanes (2) are preferably employed in amounts of from 1 to 20 mole percent by weight, and more preferably in amounts of from 4 to 8 mole percent by weight, based on the weight of the diorganopolysiloxanes (1).

By varying the percentage of Si-bonded hydrogen groups in the organopolysiloxanes (2), it is possible to obtain adhesive repellent coatings having various levels of adhesive repellency while maintaining the same weight ratio between organopolysiloxanes (2) and diorganopolysiloxanes (1).

Catalysts which promote the addition of Si-bonded hydrogen to vinyl groups employed in this invention are the same catalysts as those which have been used heretofore in the preparation of adhesive repellent coatings based on vinyl terminated diorganopolysiloxanes, and organopolysiloxanes having at least 3 Si-bonded hydrogen atoms per molecule. Examples of suitable catalysts are platinum, ruthenium, rhodium, palladium, iridium and compounds or complexes of these elements, such as $PtCl_4$, chloroplatinic acid, platinum-olefin complexes, platinum-ketone complexes and platinum-vinylsiloxane complexes as well as iron carbonyls, nickel carbonyls and cobalt carbonyls. Platinum-ketone complexes are preferred, particularly the reaction products of chloroplatinic acid and ketones, such as cyclohexanone, methyl ethyl ketone, acetone, methyl-n-propyl ketone, methyl-isobutyl ketone, methyl-n-amyl ketone, diethyl ketone, ethyl-n-butyl ketone, ethyl-iso-amyl ketone, diisobutyl ketone, acetophenone and mesityl oxide. The preparation of such platinum-ketone complexes is described in U.S. Pat. No. 3,814,731, to Nitsche et al.

When platinum or platinum compounds and/or platinum complexes are employed as catalysts to promote the addition of Si-bonded hydrogen to vinyl groups, these catalysts should be used in amounts of from 0.001 to 0.1 mole percent by weight, and more preferably from 0.01 to 0.05 mole percent by weight of elemental platinum based on the weight of diorganopolysiloxanes (1).

Organic solvents (4) which have been used heretofore in the preparation of adhesive repellent coatings based on vinyl endblocked diorganopolysiloxanes, organopolysiloxanes having at least 3 Si-bonded hydrogen atoms per molecule and catalysts which promote the addition of Si-bonded hydrogen to vinyl groups may be used in this invention. Preferably, the organic solvents are substantially free of water and are inert with respect to the other ingredients of the coating composition. Furthermore, it is preferred that these organic solvents evaporate very rapidly at a temperature of from 70 to 180° C. and at a pressure of 760 mm Hg (abs). Examples of suitable organic solvents and hydrocarbons, such as low boiling naphtha, alkane mixtures having a boiling range of from 80° to 110° C. at 760 mm Hg (abs), benzene, toluene and xylene, halogenated hydrocarbons having from 1 to 6 carbon atoms such as methylene chloride, trichloroethylene and perchloroethylene; ethers such as di-n-butylether; esters such as ethylacetate and ketones such as methyl ethyl ketone and cyclohexanone. A low boiling naphtha is the preferred organic solvent because of its availability.

The organic solvents should be employed in amounts of from about 200 to about 5,000 mole percent based on the weight of the diorganopolysiloxanes (1).

If desired, the coating compositions of this invention may contain in addition to the diorganopolysiloxanes (1), the organopolysiloxanes (2), the catalysts (3) and the organic solvents (4), other materials which are suitable additives for such compositions. Suitable additives are materials which retard the crosslinking of the organopolysiloxanes (1) at room temperature, such as benzotriazole, dialkylformamide and alkylthiourea, as well as methyl ethyl ketoxime and pyrogenically produced silicon dioxide.

In preparing the coating compositions of this invention, it is preferred that the diorganopolysiloxanes (1) be mixed with organic solvent (4) and catalyst (3) which promotes the addition of Si-bonded hydrogen to vinyl groups and thereafter organopolysiloxanes (2) which contain at least 3 Si-bonded hydrogen atoms per molecule are then added. The solutions thus prepared can be stored at room temperature for at least 7 days without any gelling of the solution and without any decrease in the crosslinking ability of the diorganopolysiloxanes (1).

When the surfaces which are to be rendered adhesive repellent are nonabsorptive or only slightly absorptive, then the coating conditions and especially the concentration of solvent and the manner in which it is applied are selected so that the diorganopolysiloxanes (1) and the organopolysiloxanes (2) are absorbed in the amount of from 0.1 to 0.5 $g/m^2$. Conversely, if the surface which are to be rendered adhesive repellent are highly absorptive, then coating conditions are selected so that the diorganopolysiloxanes (1) and the organopolysiloxanes (2) are absorbed by the surface in an amount of from 1 to 5 g/m². The need for a greater amount of organosilicon compounds for absorptive surfaces can be avoided if these surfaces are first pretreated with pore-sealing compounds, such as for example a solution of polyvinyl alcohol, particularly polyvinyl alcohol in which the degree of hydrolysis is from 74.5 to 100 mole percent, and more preferably from 85 to 90 mole percent, and has a viscosity based on a 4 percent by weight aqueous solution in water or polyvinyl acetate in an organic solvent of from 3 to 40 cP and more preferably from 16 to 32 cP at 20° C. The coating compositions of this invention may be applied to the surfaces which are to be rendered adhesive repellent by any suitable means known in the art for preparing coatings from fluid substances, such as for example by immersion, coating, pouring, spraying, calendering, printing, knife or blade coating as well as by a Meyer Rod.

The diorganopolysiloxanes (1) can be crosslinked in the same manner as has been used heretofore for the preparation of adhesive repellent coatings which contain vinyl endblocked diorganopolysiloxanes, organopolysiloxanes having at least three Si-bonded hydrogen atoms per molecule and catalysts which promote the addition of Si-bonded hydrogen to vinyl groups. Crosslinking is achieved by heating to at least 80° C. while simultaneously removing the organic solvent. In order to avoid any damage to backings on which adhesive repellency is to be induced and/or the coatings which are to be made adhesive repellent, it is preferred that the temperature not exceed 250° C. during the heating step. Generally, heating to a temperature range of from about 140° to 160° C. is preferred. A heating period of from 5 to 180 seconds is generally sufficient to achieve adequate crosslinking.

As a result of this invention, it is possible to prepare adhesive repellent coatings on various types of surfaces, such as for example paper, board, including boards made of asbestos, wood, cork, plastic, such as for example those made from polyethylene, fabrics made from natural or synthetic fibers, metals, glass, and ceramic objects. For example, the paper may be of an inferior quality, such as absorptive papers, including raw kraft paper, i.e., kraft paper which has not been pretreated with chemicals and/or polymeric substances, kraft paper having a weight of from 60 to 150 g/m², unsized papers, papers having a low degree of grinding, papers containing particles of wood, non-satinated or non-calendered papers, uncoated papers, recycled papers or expensive types of paper, such as non-absorptive papers, sized papers, papers with a high degree of grinding, wood-free papers, calendered or satinated papers, parchment papers or coated papers. The boards may be of either type as well.

Also the coating compositions of this invention may be applied to carpet felt, i.e. paper that is placed under carpets, and "simultaneous run papers" including "simultaneous run papers" which are used during the manufacture of "molded" films or decorating films or the manufacture of foamed plastics. The compositions are also suitable for the manufacture of "simultaneous run cardboard" films and cloths, for application to the undersides of self-adhesive bands and self-adhesive films or the printed side of self-adhesive labels, as well as for packaging material, such as papers, cardboard boxes, metal films and fibers, for example cardboard, plastic material, wood, iron and other solid materials used for the storage and/or transportation of adhesive materials, such as food, e.g., cakes, honey, candy and meat; bitumen, asphalt, grease-coated metal parts, and raw rubber, as well as for the coating of carriers which transfer adhesive coatings by means of the so-called "transfer process".

In the following examples all parts or percentages are by weight unless otherwise specified.

The catalyst solution employed in the following examples is prepared by adding 1 part of chloroplatinic acid to 200 parts of cyclohexanone which has been heated to 80° C. The solution thus obtained is maintained at 80° C. for 45 minutes and then subsequently dried with the aid of anhydrous sodium sulfate.

Where possible, all units in the copolymers employed in the following examples, are randomly distributed.

The Brabender Plastograph values are determined on solvent free diorganopolysiloxanes at 25° C. and at 60 revolutions per minute.

EXAMPLE 1

(a) To about 300 parts of a toluene solution containing 25 weight percent of vinyldimethylsiloxy endblocked diorganopolysiloxanes consisting of 89 mole percent of dimethylsiloxane units and 11 mole percent of diphenylsiloxane units and having a Brabender Plastograph value of 420 mkp, are added about 1185 parts of an alkane mixture having a boiling range of from 80° to 110° C. at 760 mm Hg (abs) and 6.0 parts of the catalyst solution described above.

(b) To several compositions, each containing about 100 parts of the solution prepared above are added 0.5 part of organopolysiloxanes having a viscosity of from 40 to 60 cP at 25° C. which consists of 4 mole percent of trimethylsiloxane units and methylhydrogensiloxane units and dimethylsiloxane units in the mole percent shown in Table I, and applied to imitation parchment paper having a weight of 75 g/m², by means of a doctor blade which consists of a stainless steel rod having 0.3 mm thick stainless steel wire wound thereon. The diorganopolysiloxanes crosslink in an oven at 150° C. within 2 minutes.

The coated papers are then tested to determine the level of adhesive repellency.

Two strips of 3 cm wide self-adhesive tape ("Tesafilm rot" No. 154, Beiersdorf AG, Hamburg, German Federal Republic. "Tesa" is a registered Trademark) which has an adhesive power of approximately 150 p/cm on the uncoated paper are placed on the coated paper and pressed onto the latter with a rubber roller with a force of 15 kp/cm². After heating for 20 hours at 70° C. under a weight of 20 p/cm² and then cooling to 20° C., the two adhesive tapes are separated at an angle of 180° with a speed of 30 cm/minute. The force required to separate the tape from the paper is measured. The results are illustrated in Table I.

TABLE I

| Organopolysiloxanes containing Si-bonded hydrogen | | | | |
|---|---|---|---|---|
| Methyl-hydrogen siloxane units (mole percent) | Dimethyl-siloxane Units (mole percent) | Si-bonded hydrogen (percent) | Separating force (p/cm) | Residual adhesive strength of tape (p/cm) |
| 96 | 0 | 1.66 | 113 | 110 |
| 86 | 10 | 1.46 | 111 | 117 |
| 72 | 24 | 1.18 | 100 | 109 |
| 64 | 32 | 1.03 | 91 | 122 |

TABLE I-continued

| Organopolysiloxanes containing Si-bonded hydrogen | | | | |
|---|---|---|---|---|
| Methylhydrogensiloxane units (mole percent) | Dimethylsiloxane Units (mole percent) | Si-bonded hydrogen (percent) | Separating force (p/cm) | Residual adhesive strength of tape (p/cm) |
| 56 | 40 | 0.91 | 76 | 125 |
| 48 | 48 | 0.75 | 47 | 112 |
| 40 | 56 | 0.59 | 31 | 133 |
| 32 | 64 | 0.48 | 27 | 129 |
| 24 | 72 | 0.36 | 10 | 120 |
| 14 | 82 | 0.20 | 7 | 114 |

EXAMPLE 2

About 20 parts of a toluene solution containing 25 weight percent of vinyldimethylsiloxy endblocked diorganopolysiloxanes containing 93.3 mole percent of dimethylsiloxane units and 6.7 mole percent of diphenylsiloxane units and having a Brabender Plastograph value of 730 mkp are diluted with 79 parts of an alkane mixture having a boiling range of from 80° to 110° C. at 760 mm Hg (abs) and then mixed with 0.4 parts of the catalyst solution described above.

The solution thus obtained is mixed with 0.5 part of organopolysiloxanes containing 4 mole percent trimethylsiloxane units, 72 mole percent methylhydrogensiloxane units and 24 mole percent dimethylsiloxane units and applied either immediately or after an elapsed period of time as shown in Table II to imitation parchment paper with the aid of the doctor blade described in Example 1. Crosslinking of the diorganopolysiloxanes occurs within 2 minutes in an oven at a temperature of 150° C.

The coated papers are then tested in accordance with the procedure described in Example 1 to determine their level of adhesive repellency. The results are illustrated in Table II

TABLE II

| Elapsed time between preparation of solution and coating of paper (Hours) | Separating force (p/cm) | Residual adhesive power of tape (p/cm) |
|---|---|---|
| 0 | 49 | 146 |
| 1 | 34 | 120 |
| 2 | 37 | 136 |
| 3 | 39 | 132 |
| 4 | 42 | 129 |
| 5 | 40 | 141 |
| 6 | 38 | 129 |
| 7 | 38 | 142 |
| 24 | 44 | 135 |

EXAMPLE 3

About 100 parts of the solution prepared in accordance with Example 1 (a) are mixed with 0.6 part of organopolysiloxanes containing 4 mole percent of trimethylsiloxane units, 64 mole percent methylhydrogensiloxane units and 32 mole percent of dimethylsiloxane units and applied to 6 specimens of imitation parchment paper having a weight of 75 g/m² using the doctor blade described in Example 1. Crosslinking of the diorganopolysiloxanes occurs within 2 minutes in a drying oven.

The coated papers are crosslinked and tested after an elapsed time with respect to their level of adhesive repellency in accordance with the procedure described in Example 1. The results are illustated in Table III.

TABLE III

| Elapsed time between crosslinking and testing | Required separating force (p/cm) |
|---|---|
| 0 days | 91 |
| 3 days | 94 |
| 1 week | 98 |
| 2 weeks | 95 |
| 3 weeks | 96 |
| 4 weeks | 98 |

EXAMPLE 4

(a) To about 300 parts of a toluene solution containing 25 weight percent of vinyldimethylsiloxy endblocked copolymers containing 20.3 mole percent diphenylsiloxane units and 79.7 mole percent dimethylsiloxane units and having a Brabender Plastograph value of 360 mkp are added 1185 parts of an alkane mixture having a boiling range of from 80° to 110° C. at 760 mm Hg (abs). The resultant solution is then mixed with 6 parts of the catalyst solution described above.

(b) Several compositions each containing about 100 parts of the solution prepared in Example 4 (a) above and 0.5 part of organopolysiloxanes which have a viscosity of from 40 to 60 cP at 25° C. and contain 4 mole percent of trimethylsiloxane units and methylhydrogensiloxane units and dimethylsiloxane units in the mole percentages shown in Table IV are prepared and applied to imitation parchment paper having a weight of 75 g/m², by means of the doctor blade described in Example 1. Crosslinking of the diorganopolysiloxanes occurs within 2 minutes in a drying oven.

The coated papers are tested with respect to their adhesive repellency in accordance with the procedure described in Example 1. The results are shown in Table IV.

TABLE IV

| Organopolysiloxanes containing Si-bonded hydrogen | | | | |
|---|---|---|---|---|
| Methylhydrogensiloxane units (mole percent) | Dimethylsiloxane units (mole percent) | Si-bonded hydrogen (percent) | Separating force (p/cm) | Residual adhesive strength of tape (p/cm) |
| 96 | 0 | 1.66 | 114 | 107 |
| 64 | 32 | 1.03 | 103 | 131 |
| 56 | 40 | 0.91 | 92 | 124 |
| 48 | 48 | 0.75 | 70 | 139 |
| 40 | 56 | 0.59 | 53 | 136 |
| 32 | 64 | 0.48 | 39 | 127 |
| 24 | 72 | 0.36 | 23 | 126 |
| 14 | 82 | 0.20 | 9 | 146 |

EXAMPLE 5

Several compositions, each containing 100 parts of the catalyzed solution prepared in accordance with the procedure described in Example 4 (a) above, and 0.5 part of organopolysiloxanes each of which consists of 4 mole percent of trimethylsiloxane units and methylhydrogensiloxane units and diphenylsiloxane units in the mole percentages shown in Table V are prepared and then applied to imitation parchment paper having a weight of 75 g/cm² by means of the doctor blade described in Example 1. Crosslinking of the diorganopolysiloxanes occurs in the drying oven within 2 minutes.

The coated papers are then tested in accordance with the procedure described in Example 1 to determine their level of adhesive repellency.

The results are illustrated in Table V.

TABLE V

| Organopolysiloxanes containing Si-bonded hydrogen | | | | |
|---|---|---|---|---|
| Methylhydrogensiloxane units (mole percent) | Diphenylsiloxane units (mole percent) | Si-bonded hydrogen (percent) | Separating force (p/cm) | Residual adhesive strength of tape (p/cm) |
| 90 | 6 | 1.26 | 95 | 146 |
| 78 | 18 | 0.68 | 91 | 101 |
| 69 | 27 | 0.41 | 53 | 122 |
| 64 | 32 | 0.23 | 24 | 105 |

Although specific examples of the invention have been described herein, it is not intended to limit the invention solely thereto, but to include all the variations and modifications falling within the spirit and scope of the appended claims.

What is claimed is:

1. A process for imparting varying levels of adhesive repellency to a coated substrate which comprises coating the substrate with a composition containing (1) diorganopolysiloxanes having terminal Si-bonded vinyl groups in which 3 to 30 mol percent of the nonterminal siloxane units are diphenylsiloxane units and at least 50 mol percent of the remaining organic radicals on the siloxane units are methyl radicals, said diorganopolysiloxanes (1) having an mkp value of from 300 to 800 as determined in a Brabender Plastograph at 25° C., and at 60 revolutions per minute; (2) organopolysiloxanes having at least 3 Si-bonded hydrogen atoms per molecule, in which the adhesive repellency of the resultant coating is inversely proportional to the mol percent of Si-bonded hydrogen present on the organopolysiloxanes (2); (3) a catalyst which promotes the addition of Si-bonded hydrogen atoms to the vinyl groups and (4) an inert organic solvent and thereafter heating the coated substrate to a temperature of at least 80° C.

2. The process of claim 1 wherein the coated substrate is heated to a temperature up to 250° C.

3. The process of claim 1 wherein the substrate is first treated with a pore-sealing compound.

4. The process of claim 1 wherein the pore-sealing compound is polyvinyl alcohol.

5. The substrate treated in accordance with the process of Claim 1.

6. The treated substrate of claim 5 wherein the diorganopolysiloxanes (1) and organopolysiloxanes (2) are absorbed in an amount of from 0.1 to 5 g/m$^2$.

* * * * *

UNITED STATES PATENT AND TRADEMARK OFFICE
CERTIFICATE OF CORRECTION

PATENT NO. : 4,208,504

DATED : June 19, 1980

INVENTOR(S) : Friedrich Hockemeyer, Wolfgang Hechtl, Heinrich Marwitz and Paul Hittmair It is certified that error appears in the above-identified patent and that said Letters Patent are hereby corrected as shown below:

[30] Foreign Application Priority Data

March 5, 1975 [DE] Fed. Rep. of Germany ... 25 09 620

Signed and Sealed this

Twenty-third Day of December 1980

[SEAL]

Attest:

SIDNEY A. DIAMOND

Attesting Officer

Commissioner of Patents and Trademarks